Patented Apr. 18, 1944

2,347,131

UNITED STATES PATENT OFFICE 2,347,131

MANUFACTURE OF LEAD OXIDES

Ralph L. Seabury and Robert A. Daily, Muncie, Ind., assignors to General Motors Corporation, Detroit, Mich., a corporation of Delaware No Drawing. Application December 22, 1939, Serial No. 310,554

6 Claims. (Cl. 23—146)

This invention relates to the manufacture of lead oxides and more particularly to the manufacture of litharge and red lead used in the manufacture of lead plate storage batteries.

The present invention is concerned chiefly with the manufacture of a litharge ingredient for storage battery grid paste such as will enable the manufacturer to produce at lower cost and with greater uniformity storage batteries having satisfactorily operating characteristics as well as long life.

In order that the advantages which flow from the use of our improved litharge may be fully understood, we shall describe briefly a procedure heretofore used commercially in the manufacture of storage batteries in which the practice has been to employ the Barton mill process of making litharge.

In the Barton mill, an agitated and swirling cloud of lead mist or molten lead droplets is maintained in the chamber, which forms the upper part of the pot or mill, by the action of a flat iron blade skimming over the surface of the molten lead. Atmospheric or controlled air is either forced or aspirated into this hot swirling cloud of molten lead droplets which results in an extensive oxidation of the fine lead particles. The extent of this oxidation varies with operating conditions but is ordinarily about 75%. The products of this oxidation are yellow litharge and red litharge, both having the chemical formula PbO. The proportion of these litharges can be varied over wide limits by operating conditions but a common ratio is 1 to 1. Thus a common product of the Barton mill may be expressed as:

| | Per cent |
|---|---|
| Yellow litharge | 37.5 |
| Red litharge | 37.5 |
| Free metallic lead dust | 25.0 |

The product of the Barton mill will be hereinafter referred to as Barton litharge.

This combustion or oxidation of the molten lead within the chamber liberates considerable heat and care must be taken lest enough heat is liberated to melt the cast iron pot. As fast as the oxide is produced, it is either blown or aspirated beyond the confines of the oxidation chamber and allowed to cool in large settling tanks from which it can be transferred to storage bins for use in paste manufacture.

More specifically the mixing process heretofore practiced included the following steps: water was mixed with the powder mixture containing litharge and free lead particles to the extent of about 10% by weight. This water reacted with the lead oxide and the fine lead particles to form a limited amount of hydrated lead compounds of a colloidal character. It is thought that this superficial hydration is largely a surface phenomenon because of the very low solubility of these hydrated compounds in water but nevertheless is sufficient in amount to give considerable plasticity to the dampened mass. Upon addition of a measured amount of moderately strong sulfuric acid to the dampened mass, hydrated and basic lead sulfate compounds are probably formed that at the time are more or less colloidal in character but which later become partially micro-crystalline. The extent of the reaction and the nature of the products of the reaction is dependent upon the amount of acid added to the dampened mass and the temperature. This chemical reaction also produces considerable heat which in conjunction with the moisture present results in the transformation of some of the residual yellow litharge into red litharge.

The battery grids were then pasted with but little further reaction of the ingredients; and the pasted grids where then passed through the curing tunnel within which they were heated for several hours. The grids entered an inlet zone at moderate temperature and high humidity. As the grids progressed through the curing tunnel, the temperature was progressively increased while the humidity progressively was decreased to practically zero humidity at the outlet. The intended purpose of this curing process was to cure and dry the paste and to convert the free lead to litharge and to convert the yellow litharge to red litharge. This curing process required about twenty-four hours in order that these transformations might take place. This time for curing in the tunnel does not include seventy-two hours time for aging.

Positive and negative grids pasted and cured in the manner referred to were then assembled with separators and terminals and then with battery boxes and covers. The cell connecting straps were burned onto the proper terminals and the covers sealed in position. Then the batteries were filled with dilute sulphuric acid and were given an initial formation by passing an electric current through them. During the initial formation process the active material on the positive plate becomes lead peroxide, $PbO_2$, and the active material on the negative plate becomes sponge lead. This initial formation process generally required about forty hours. It appeared that this amount of time was required in order to convert the materials of the positive plates to lead peroxide. Even then not all of the conversion takes place during initial formation. Further conversion might take place during several cycles of charge and discharge of the battery in service.

After the initial formation step the batteries were emptied and might be shipped dry or might be filled before shipment with dilute sulphuric acid of the proper specific gravity required for placing the battery in service.

It has been our experience in the manufacture of storage batteries according to the process heretofore described that, regardless of the amount of care taken with the proportions of the ingredients used in the paste mixture and the uniformity of procedure throughout the whole process of manufacture, the desired uniformity of product could not always be obtained. From our study of this situation we concluded that this lack of uniformity might be due to variations in the chemical transformations taking place in the curing tunnel regardless of the care taken in securing uniformity of time, temperature and humidity. It therefore became one of the objects of the present invention to provide for the conversion of metallic lead to litharge and for the conversion of yellow litharge to red litharge in a step preceding the mixing of the paste. More specifically it is an object of the present development to provide for the conversion of the product of the Barton mill (or other apparatus which gives a product containing free metallic lead and yellow litharge) to as much red litharge as possible and as little of free metallic lead as possible. By obtaining these conversions before mixing we are able to minimize many of the uncertainties heretofore present in the manufacture of storage batteries. The yellow litharge is unstable and its presence in cured paste is undesirable. By the effecting of the conversion from yellow to red litharge before the paste is mixed we are able to eliminate the uncertainties of the results of the curing process which follows the mixing process. The lead content of the product of the Barton mill was more or less converted to litharge in the old process during mixing and curing, but the extent to which the lead content was converted was difficult to control and it was possible that this variation of conversion of lead content was a factor which contributed to lack of uniformity in the storage batteries both with respect to performance and life. By providing for the substantial conversion of the lead content to lead oxide before mixing and curing we believe that another factor contributing to uncertainties in results has been eliminated.

By a method to be described later, we are to convert Barton litharge (37½% yellow litharge, 37½% red litharge and 25% free metallic lead dust) to approximately 8% free lead and 92% red litharge. This new litharge we will call hereinafter "converted litharge." One of the advantages that flow from the use of converted litharge in place of a litharge containing a mixture of red and yellow litharge is in the substantial reduction in time required for curing and baking the pasted plates. Since we have eliminated in the curing and baking process the conversion of yellow to red litharge, we have found it possible to reduce the curing and baking down from twenty-four hours to a period of three to four hours. Furthermore, we have eliminated the aging of seventy-two hours required in the whole process.

Furthermore, the apparatus required for curing and baking pasted grids in which converted litharge is used in the paste is much smaller than the curing tunnel required in the old process; therefore the new apparatus is much less expensive to construct and maintain.

Another advantage which results from the use of converted litharge is that it renders more certain and uniform in effect the use of a subsequent procedure known as pickling, which procedure results in a material reduction in the time required for initially forming the storage battery plates after they have been assembled in a battery container. This pickling procedure is not a part of the present invention, but is described and claimed in the copending application of Robert A. Daily, Serial No. 310,553, filed December 22, 1939, and now matured into Patent Number 2,287,868.

We will now describe the conversion of Barton litharge into what we call "converted litharge."

Barton litharge is conveyed to a converter. In this converter the reaction in the conversion of the yellow litharge to red litharge is accelerated by heat and agitation in the presence of moisture. In the presence of moisture, the tendency to transform yellow to red litharge is facilitated by a moderate temperature, for example, 100° F. In the presence of small amounts of moisture, the oxidation of finely divided metallic lead is accelerated by agitation in the presence of air or oxygen and is accompanied by considerable rise in temperature. The transformation from yellow to red litharge will take place under any conditions of moisture, if heated to a moderate temperature, but the oxidation of finely divided metallic lead is greatly retarded when the moisture is in excess about 7% by weight of the oxide. Therefore, in order to utilize the rise in temperature accompanying the oxidation of the finely divided metallic lead to accelerate the transformation of yellow to red litharge, it is necessary to control the moisture content during the period of agitation. The method will work satisfactorily with water in proportion of ½% to about 7%. We prefer adding about 1½% to 3½% by weight of moisture and mixing thoroughly. Thorough mixing or agitation is essential as well as the presence of air or oxygen; otherwise no appreciable reaction takes place. The oxidation of about ½ the original metallic lead will take place in about 15 minutes, and oxidation of ⅔ of the original lead content in about 30 minutes. The conversion of the yellow litharge to the red litharge is complete within about 5 minutes.

One form of apparatus which may be used as the Barton litharge converter is known commercially as a Herreshoff roasting furnace. This apparatus has a series of oppositely inclined annular shelves above which scrapers rotate and with which these scrapers engage. The Barton litharge to be converted is fed into the top of the Herreshoff furnace where it is received by the top shelf thereof. The rotary scrapers cause the Barton litharge to be thoroughly mixed with water, which may be introduced in stages in the form of a spray, and cause the Barton litharge to move from one shelf down to the next and so on to the bottom of the furnace where the converted litharge is received by a suitable hopper. The moisture is introduced in stages at room temperature. The heat of conversion evaporates some of the water as the conversion takes place, hence it is desirable to add more water as the litharge progresses through the furnace. The litharge is substantially dry by the time it reaches the hopper at the discharge end due to evaporation of the moisture during the conversion process. We contemplate so controlling the operation of the Herreshoff furnace that the moisture may be continuously added, rather than intermittently, in the amount of about ½% at each stage to bring the total amount of water added to within the preferred range.

Converted litharge is stable and may be prepared in advance of use and stored for a considerable period. While preparation of converted litharge in advance of mixing the grid paste has made possible the development of our improved curing, baking and pickling to be described in detail later, it is apparent that converted litharge can be used advantageously with any other subsequent treatment or processes which might be suitable for storage battery manufacture, since a stable lead powder has been provided in advance. Furthermore converted litharge can be used for other purposes, since it can be readily converted to red lead for making paint or for use as an ingredient in the preparation of paste for battery plates. The conversion of converted litharge to red lead may take place in a separate Herreshoff furnace or in the same furnace as that in which the conversion of Barton litharge takes place provided that the furnace is of such size that the reaction can be carried on long enough to convert not only the yellow to red litharge but the red litharge to red lead. It is to be understood that when Barton litharge is mentioned that we refer to litharge formed in the Barton mill process and that the percentages of yellow litharge, red litharge and free metallic lead dust therein may vary within broad limits. Co-pending application Serial No. 395,674 is also directed to the conversion of Barton litharge to substantially red litharge.

While the embodiment of the present invention as herein disclosed, constitutes a preferred form, it is to be understood that other forms might be adopted, all coming within the scope of the claims which follow.

What is claimed is as follows:

1. In a process of converting Barton litharge, which comprises a mixture of yellow litharge and red litharge together with some metallic lead, to substantially pure red litharge; the steps of heating the Barton litharge in the loose condition in an oxidizing atmosphere to a temperature between 100° F. and 212° F. and simultaneously supplying water thereto in quantities of 7% or less of the total weight of litharge, said heating stage being carried out for a time sufficient to convert substantially all of the yellow litharge to red litharge.

2. In a process of converting Barton litharge, which comprises a mixture of yellow litharge and red litharge together with some metallic lead, to substantially pure red litharge; the steps comprising, heating the Barton litharge under oxidizing conditions to a temperature between 100° F. and 212° F., and simultaneously adding water to the litharge in percentages of from ½ to 7% of the total weight of the litharge, said heating step being carried out for a time sufficient to cause substantially all of the Barton litharge to be converted to red litharge.

3. In a process of converting Barton litharge, which comprises a mixture of yellow litharge and red litharge together with some metallic lead, to substantially pure red litharge; the steps of heating the Barton litharge under oxidizing conditions in the neighborhood of 100° F., and simultaneously adding water in percentages of from 1½ to 3½% of the total weight of the litharge, said heating step being carried out for a time sufficient to cause a major portion of the Barton litharge to be converted to red litharge.

4. In a process of converting Barton litharge, which comprises a mixture of yellow litharge and red litharge together with some metallic lead, to substantially pure red litharge; the steps of heating the Barton litharge in a furnace under oxidizing conditions to a temperature between 100° F. and 212° F., progressively adding water to the litharge in percentages of from ½ to 7% of the total weight of the litharge, mixing the litharge and water while continuing to heat the same, and then when the Barton litharge is substantially completely converted to red litharge discharging the converted product from the furnace.

5. In a continuous process of manufacturing substantially pure red litharge from Barton litharge which comprises a mixture of yellow and red litharge together with some metallic lead, continuously feeding Barton litharge to a multiple stage furnace, supplying water progressively at different stages so that the total water supplied does not exceed 7% of the weight of litharge being passed through the furnace, mixing the water and litharge at the various stages and continuously heating the mixed product to a temperature between 100° F. and 212° F., and under oxidizing conditions, whereby the Barton litharge is converted to red litharge and the red litharge upon being discharged from the furnace is substantially dry.

6. In the process of making red litharge from a convertible lead containing material which includes a major portion of a mixture of yellow and red litharge, the steps of heating the loose granular lead containing material in an oxidizing atmosphere at a temperature below 212° F. and above 100° F., and simultaneously supplying water in quantities of from ½% to 7% of the total weight of litharge thereto, said heating stage being carried out by a period of at least 20 minutes whereby substantially all of the convertible lead material is changed to red litharge.

RALPH L. SEABURY.
ROBERT A. DAILY.